US012664274B2

(12) United States Patent
Mantin et al.

(10) Patent No.: US 12,664,274 B2
(45) Date of Patent: Jun. 23, 2026

(54) DETECTION AND FILTRATION OF PHANTOM PACKAGES IN LARGE LANGUAGE MODEL GENERATED CODE

(71) Applicant: INTUIT INC., Mountain View, CA (US)

(72) Inventors: Itsik Yizhak Mantin, Shoham (IL); Itay Hazan, Beer Sheva (IL); Paul Hubbard, San Diego, CA (US); Jimmy Armitage, Escondido, CA (US)

(73) Assignee: INTUIT INC., Mountain View, CA (US)

( * ) Notice: Subject to any disclaimer, the term of this patent is extended or adjusted under 35 U.S.C. 154(b) by 90 days.

(21) Appl. No.: 18/933,295

(22) Filed: Oct. 31, 2024

(65) Prior Publication Data

US 2026/0119658 A1      Apr. 30, 2026

(51) Int. Cl.
G06F 21/56 (2013.01)
G06F 8/35 (2018.01)

(52) U.S. Cl.
CPC .............. G06F 21/563 (2013.01); G06F 8/35 (2013.01); *G06F 2221/033* (2013.01)

(58) Field of Classification Search
CPC ..... G06F 21/563; G06F 8/35; G06F 2221/033
USPC ......................................................... 726/23
See application file for complete search history.

(56) References Cited

U.S. PATENT DOCUMENTS

| | | | |
|---|---|---|---|
| 11,436,330 B1 * | 9/2022 | Jennings | ............... G06F 21/563 |
| 11,586,436 B1 * | 2/2023 | Jennings | ................... G06F 8/61 |
| 11,609,984 B2 * | 3/2023 | Carson | ............... H04L 63/1441 |
| 11,698,967 B2 * | 7/2023 | Jennings | ............... G06F 21/566 |
| | | | 726/24 |
| 2022/0277081 A1 * | 9/2022 | Segal | ...................... G06F 21/53 |
| 2024/0045956 A1 * | 2/2024 | Fire | ....................... G06F 21/563 |
| 2024/0419793 A1 * | 12/2024 | Stussi | ................... G06F 21/563 |
| 2025/0094581 A1 * | 3/2025 | David | ................... G06F 21/563 |
| 2025/0117479 A1 * | 4/2025 | Yang | ........................... G06F 8/75 |
| 2025/0245000 A1 * | 7/2025 | Styliadis | ................... G06F 8/71 |
| 2025/0307420 A1 * | 10/2025 | Hen | ........................ G06F 21/554 |
| 2025/0322207 A1 * | 10/2025 | Matrosov | ............... G06F 21/50 |

* cited by examiner

*Primary Examiner* — Samson B Lemma
(74) *Attorney, Agent, or Firm* — Patterson + Sheridan, LLP

(57)      ABSTRACT

Aspects of the present disclosure relate to detecting and filtering packages in large language models. Embodiments include generating a first set of code using a large language model. Embodiments further include comparing packages used in the first set of code to certain packages contained in one or more known lists. Embodiments further include identifying a list of phantom packages based on the comparing. Embodiments further include prompting the large language model to generate a second set of code. Embodiments further include analyzing the second set of code based on the list of phantom packages. Embodiments further include determining, based on the analyzing, not to display the second set of code via a user interface.

16 Claims, 5 Drawing Sheets

DETECTION AND FILTRATION OF PHANTOM PACKAGES IN LARGE LANGUAGE MODEL GENERATED CODE

INTRODUCTION

Aspects of the present disclosure relate to techniques for detecting and filtering phantom packages in code generated by language processing machine learning models. In particular, techniques described herein involve evaluating a first set of code generated using a language processing machine learning model to create a list of phantom packages against which to evaluate subsequent sets of code generated using the language processing machine learning model to ensure code safety and improve computing security.

BACKGROUND

Every year, millions of people, businesses, and organizations around the world use software applications to assist with countless aspects of life. Because of the widespread use of machine learning models, like language processing machine learning models, in software applications, such models are frequently the target of fraudulent and unsecure activity. In particular, some language processing machine learning models, including large language models, often utilize generic pre-trained models and/or pre-written code that can then be further trained and/or altered, respectively.

Generic models and pre-written code can be downloaded for free from various websites and other sources. Models and code from such sources may contain a certain number of packages that may or may not be executed when the code is run. In some cases, the authors of the code have the opportunity to include malicious packages that can infect a subsequent user's machine when executed. In addition, such code may contain phantom packages which at the time do not correspond to any existing package. A malicious actor, however, can later create a package that has the same name as the phantom package and that contains malware. These situations pose a significant threat to language processing machine learning model security, as such phantom packages may be included undetected in data used to train a language processing machine learning model and later become dangerous to a user's machine.

Existing techniques for preventing fraudulent or unsecure activity in language processing machine learning models do not address this issue of phantom packages. Thus, there is a need in the art for improved techniques for detecting and filtering packages in code generated by language processing machine learning models.

BRIEF SUMMARY

Certain embodiments provide a method of detecting and filtering packages in code generated by large language models. The method generally includes: generating a first set of code using a large language model; comparing packages used in the first set of code to certain packages contained in one or more known lists; identifying a list of phantom packages based on the comparing; prompting the large language model to generate a second set of code; analyzing the second set of code based on the list of phantom packages; and determining, based on the analyzing, not to display the second set of code via a user interface.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
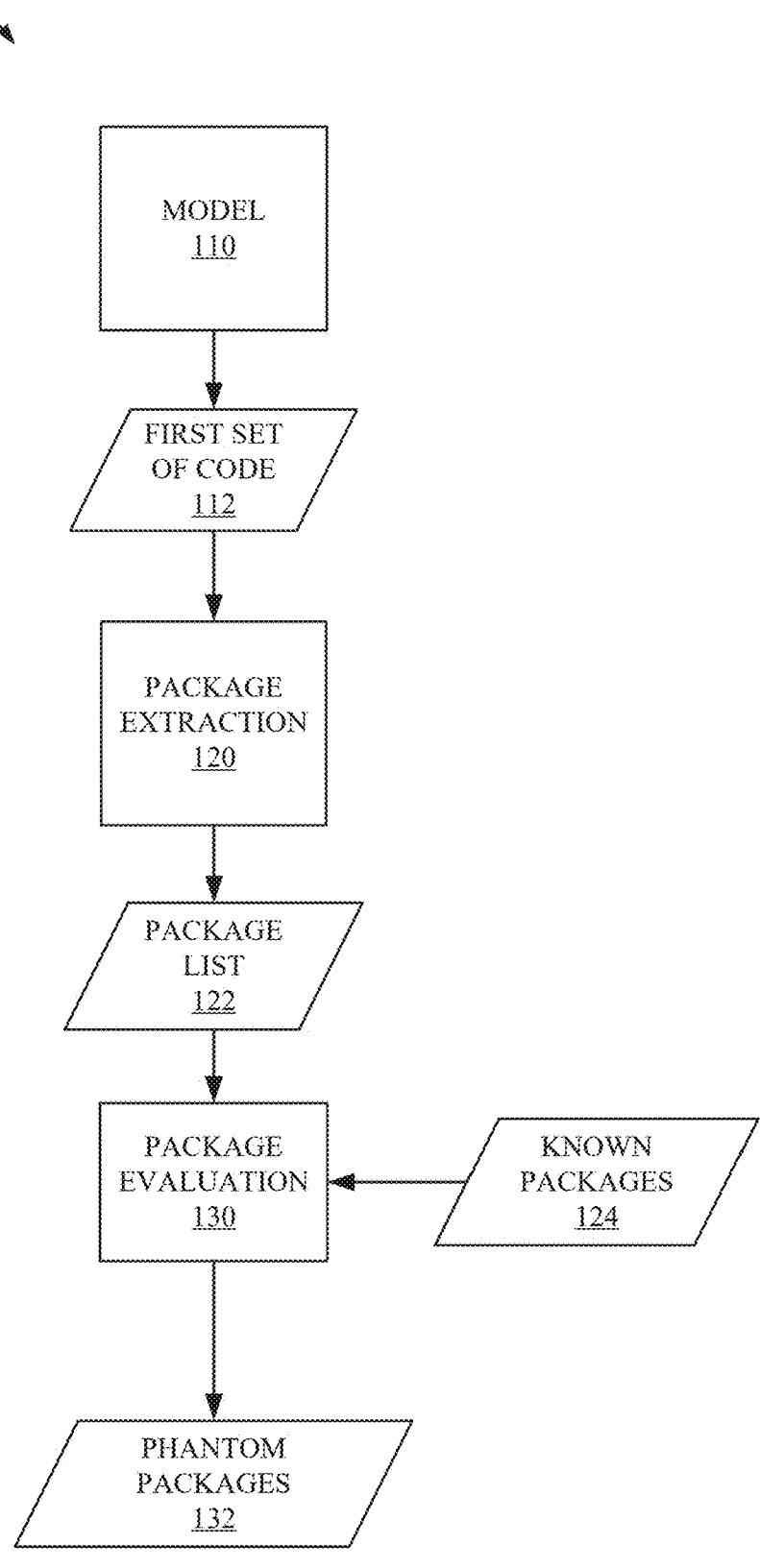
FIG. 1 depicts an example workflow related to detecting and filtering packages in code generated by language processing machine learning models.

Aspects of the present disclosure provide apparatuses, methods, processing systems, and computer-readable mediums for detecting and filtering packages in code generated by language processing machine learning models such as large language models (LLMs).

According to some embodiments, a language processing machine learning model such as an LLM may be prompted to generate a first set of code. For example, the prompt may be a natural language prompt. Packages contained in that first set of code may then be compared to packages contained in known lists, which may include a permissible package list and a malicious package list. According to certain embodiments, packages contained in the first set of code may be identified based on a regular expression search, a string search, a syntax tree generated based on the first set of code, and/or one or more other techniques. Based on comparing the packages in the generated code to the packages in the known lists, a list of phantom packages may be created. In some embodiments, phantom packages may be identified as those contained neither in the list of permissible packages nor in the list of malicious packages. The identified packages may then be added to and stored in the list of phantom packages. In some cases, the language processing machine learning model is prompted multiple times, such as using different natural language prompts, in order to generate multiple sets of code, and each of the multiple sets of code is analyzed in a similar way according to the known list(s) to identify phantom packages present in the code.

According to some embodiments, the language processing machine learning model may then be prompted to generate a new set of code. For example, the prompt may be a natural language prompt provided by a user. The new set of code may be analyzed based on the list of phantom packages. In some embodiments, packages contained in the new set of code may be compared to packages contained in the list of phantom packages. In certain embodiments, packages in the new set of code may also be compared to packages contained in the list of malicious packages. Based on analyzing the new set of code, the language processing machine learning model may determine whether to display the new set of code via a user interface and/or otherwise determine whether the new set of code is safe for use. In some embodiments, a security risk score may be used. The security risk score may be based on the number of packages in the new set of code that are identified as being contained in the list of phantom packages and/or in the list of malicious packages. The new set of code may not be displayed if the number of such packages exceeds a threshold number, if a security risk score based on the number of such packages exceeds a threshold, and/or the like. For example, code containing more than a threshold number of phantom packages and/or malicious packages may be deemed to be unsecure and therefore not displayed to the user and/or otherwise may be discarded.

In some embodiments, the language processing machine learning model may be prompted to generate an alternative set of code if a previous set of code was determined to be unsecure (e.g., based on identification of phantom packages). For example, the language processing machine learning model may be instructed in a prompt not to use packages contained in the list of phantom packages (e.g., one or more packages from the previous set of code that were identified to be included in the list of phantom packages and/or all packages in the list of phantom packages) when generating the alternative set of code. The alternative set of code, once confirmed to not contain any packages from the list of phantom packages (and, in some embodiments, to not contain any packages from the list of malicious packages), may then be displayed to the user.

In other embodiments, a determination may be made of whether one or more identified phantom packages in the list of phantom packages were used in more than a threshold number of sets of code generated by the language processing machine learning model. For example, if the threshold is exceeded, the particular phantom package or packages may be flagged as malicious, the particular phantom package or packages may be excluded (e.g., via instructions in a prompt) from future sets of code generated by the language processing machine learning model, the language processing machine learning model may be re-trained (e.g., using a different set of training data than was used to previously train or fine-tune the model) or deemed unsecure and no longer utilized, and/or the like.

Embodiments of the present disclosure provide numerous technical and practical effects and benefits. For example, techniques described herein allow for improved computer security by detecting and filtering both known and unknown packages contained in code generated by a language processing machine learning model such as a large language model. Existing techniques do not provide for identifying and preventing phantom packages in code generated by language processing machine learning models. Unlike typical malicious packages, which may already be known to pose a danger to a computing system, phantom packages are often overlooked, making them an even greater threat to the security of a computing system. The phantom package may only comprise a name when a set of code is first downloaded or generated. Subsequently, however, an individual may create a package with the same name that contains malware, such that when the phantom package is executed, it may infect the computer system. The present disclosure solves this technical problem. First, during an offline "learning" phase by which a list of phantom packages is generated, one or more phantom packages may be detected by comparing all of the packages in a first set of code generated by a language processing machine learning model to those contained in known lists. For example, the packages may be compared to existing malicious packages and permissible packages. If any package contained in the first set of code is not in the known lists, it can be identified as a phantom package and stored in a corresponding list. Next, once a list of phantom packages has been generated, during an online or "runtime" phase, a second set of code generated by the language processing machine learning model may be analyzed to determine whether it contains phantom packages, malicious packages, or both by comparing the packages contained in the second set of code to packages contained in the list(s). In some embodiments, if more than a threshold number of phantom packages, malicious packages, or both are contained in the second set of code, one or more actions may be taken. For example, the second set of code may not be displayed via a user interface and/or may otherwise be discarded. In another example, the language processing machine learning model may be prompted to generate a set of "safe" code not containing the identified phantom packages. An action may also be taken based on detecting that one or more phantom packages were used in more than a threshold number of sets of code generated by the language processing machine learning model, such as re-training the language processing machine learning model (e.g., using a different set of training data than was used to previously train or fine-tune the model) or determining not to use the language processing machine learning model. The present disclosure therefore improves computing security by automatically detecting unknown and potentially harmful phantom packages and filtering them out of sets of code generated by a language processing machine learning model, thereby preventing a user from executing code that may be harmful to a computing system.

It is noted that code that "includes" a phantom package or malicious package may be code that includes a reference to such a package and/or that is configured to import and/or otherwise utilize such a package when executed.

Example Workflows Related to Detecting and Filtering Packages in Code Generated by Language Processing Machine Learning Models FIG. 1 depicts an example workflow 100 related to detecting and filtering phantom packages in code generated by language processing machine learning models. For example, workflow 100 may represent an offline "learning" workflow by which a list of phantom packages is generated, such as before model 110 is used at runtime by one or more developers to generate code.

A model 110 may comprise a machine learning model. In a particular example, model 110 is a language processing machine learning model such as a large language model (LLM). For example, model 110 may have been trained on a large training data set in order to process natural language inputs and generate natural language content in response. In some embodiments, model 110 is a generative pre-trained transformer (GPT) model that has been trained on a large set of training data (e.g., across a plurality of domains), and is capable as a result of such training to perform a wide variety of language-related tasks in response to natural language prompts. In some embodiments model 110 has been fine-tuned for one or more particular domains, such as for use with a particular software application or for a specific purpose, while in other embodiments model 110 has been trained in a more general fashion and has not been fine-tuned in such a manner. Model 110 may have a large number of tunable parameters, which are iteratively adjusted during a model training process based on training data. In alternative embodiments, model 110 may be another type of machine learning model that is capable of generating content such as code. For example, model 110 may be a generative adversarial network (GAN), an autoencoder model, an autoregressive model, a diffusion model, a Bayesian network, a hidden Markov model, and/or the like.

The model 110 may be prompted to generate a first set of code 112, which may contain a number of packages. For example, model 110 may be provided with one or more natural language prompts, such as from a set of code generation prompts (e.g., that were previously input by one or more users, that were generated by one or more experts, and/or that were automatically generated using a machine learning model). Each such prompt provided to model 110 may include instructions for model 110 to generate code according to one or more parameters and/or for one or more purposes, such as specifying functionality to be performed by the code, a language for the code, and/or one or more other constraints for the code. In one example, a prompt includes natural language instructions to create code that connects to a particular database. In another example, a prompt includes natural language instructions to create code that connects between a server corresponding to a first programming language to a client corresponding to a second programming language. In some embodiments, a package may comprise a logical container grouping related classes, interfaces, program elements, or a combination thereof. A unique name may be associated with each package.

Package extraction 120 may be performed on the first set of code 112 to produce a package list 122, comprising all of the packages contained in the first set of code 112. In some aspects, package extraction 120 may involve receiving package list 122 as an output from model 110 in response to prompting model 110 (e.g., in the same prompt used to generate first set of code 112 or a different prompt) to provide a list of packages included in first set of code 112. In other aspects, package extraction 120 may involve searching through first set of code 112 based on one or more patterns, regular expressions, search terms, rules, a syntax tree generated based on the first set of code 112, and/or the like to identify all packages included in first set of code 112.

In one example, packages are identified by searching for a particular string or pattern (e.g., via regular expression), such as the term "import" or another term that is commonly used to reference or otherwise utilize packages in one or more programming languages.

In some aspects, in order to identify packages in first set of code 112, a syntax tree of first set of code 112 is generated. For example, first set of code 112 may be parsed to create an abstract syntax tree, and then the syntax tree may be analyzed to identify instances of one or more functions that are used to import or otherwise utilize packages (e.g., instances of the "import" function). Each such instance may reference a package, and the packages referenced in such instances may be identified as packages included in first set of code 112. Such an approach involving a syntax tree may allow for detecting packages even if the text of the code itself includes characters (e.g., punctuation, emoticons, and/or the like) that would otherwise interfere with detecting particular strings (e.g., "import"), such as if such characters were included in order to defeat such detection techniques. For example, model 110 may have been trained to include characters that interfere with detecting strings or patterns associated with importing packages in order to defeat package detection techniques (e.g., that use regular expressions). Use of a syntax tree may overcome such an attempt to circumvent security measures by analyzing the syntactical structure of the code to detect packages even when extraneous characters are included in the code in connection with references to such packages.

Package evaluation 130 may then be performed, such as by comparing known packages 124 to the packages in the package list 122. The known packages 124 may comprise one or more lists of malicious packages, one or more lists of permissible packages, or both. For example, malicious packages may include packages previously identified (e.g., by one or more users, experts, entities, or techniques) as dangerous to computing security, a software application, the user's machine, or a combination thereof when the particular package is executed. For example, malicious packages may include packages that have been identified as malware. Continuing the example, permissible packages may include packages previously identified (e.g., by one or more users, experts, entities, or techniques) as safe when the particular package is executed. Any packages that are determined during package evaluation to be in the package list 122 but not in the known packages 124 may be added to a list of phantom packages 132. In some cases, packages that are determined during package evaluation to be in the package list 122 but not in the known packages 124 are first provided to a user for manual review and confirmation that such packages are indeed phantom packages, and are added to the list of phantom packages 132 after receiving user input confirming that such packages are phantom.

It is noted that the process described with respect to workflow 100 may be repeated for multiple sets of code generated by model 110 based on multiple prompts, such as to identify as many phantom packages 132 as possible during such subsequent iterations. As described in more detail below with respect to FIG. 2, phantom packages 132 may then be used in an online "runtime" phase to detect and filter phantom packages in code generated by model 110.

In some cases, the list of phantom packages 132 is updated at regular intervals and/or when certain conditions occur, such as re-running a process such as that described with respect to workflow 100 at regular intervals, and/or the like. Thus, the list of phantom packages 132 may be kept up to date over time.

Figure 2:
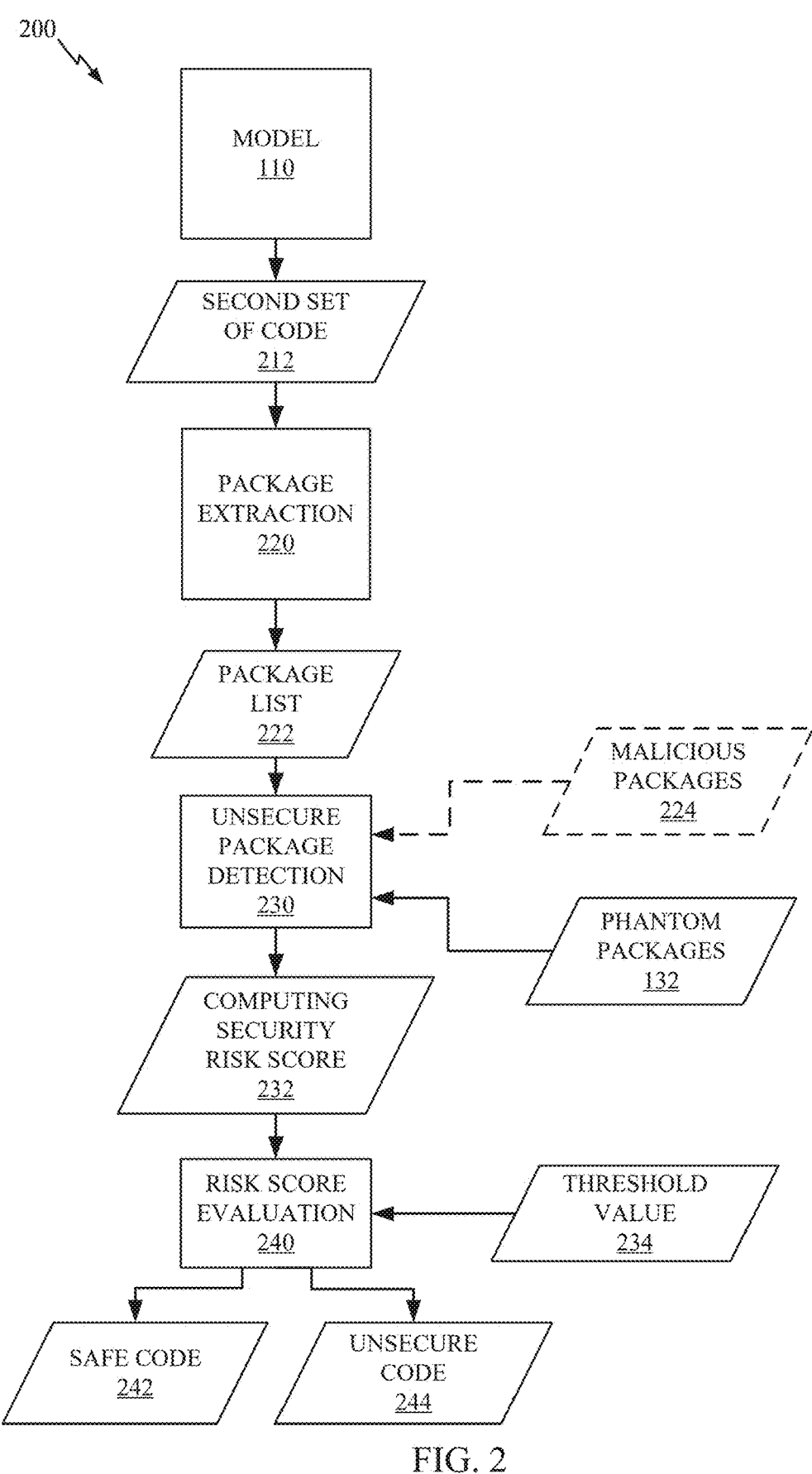
FIG. 2 depicts an additional example workflow related to detecting and filtering packages in code generated by language processing machine learning models.

FIG. 2 depicts an additional example workflow 200 related to detecting and filtering packages in code generated by language processing machine learning models. In particular, FIG. 2 depicts additional steps to be performed using model 110 subsequent to those depicted in FIG. 1, such as during an online "runtime" phase.

The model 110 may be prompted to generate a second set of code 212, which may contain a number of packages. A prompt provided to model 110 may include instructions for model 110 to generate second set of code 212 according to one or more parameters and/or for one or more purposes, such as specifying functionality to be performed by the code, a language for the code, and/or one or more other constraints for the code. Package extraction 220 may be performed on the second set of code 212 to produce a package list 222, comprising all of the packages contained in the second set of code 212. As discussed above, package extraction 220 may involve receiving package list 222 from model 110 in response to a prompt and/or may involve searching through second set of code 212 for packages based on one or more patterns, regular expressions, search terms, rules, a syntax tree generated based on the second set of code 212 (e.g., as described above), and/or the like to identify all packages included in second set of code 212. Unsecure package detection 230 may then be performed, wherein the packages contained in package list 222 are compared to phantom packages 132 and, in some aspects, malicious packages 224 (e.g., which may include a subset of known packages 124 of FIG. 1 that were previously identified as malicious). Based on comparing the packages, a computing security risk score 232 may be assigned to the second set of code 212. The computing security risk score 232 may be determined based on the number of malicious packages, phantom packages, or both that are contained in the package list 222, whether each of such packages is used in the code beyond being imported (e.g., is functionality of a package actually invoked within the code after being imported or is the package merely imported without being further utilized), and/or the like. Risk score evaluation 240 may then be performed, such as to determine whether the second set of code 212 is safe code 242 or unsecure code 244. In some embodiments, determining whether the second set of code 212 is safe code 242 or unsecure code 244 comprises determining whether the number of malicious packages, phantom packages, or both that are contained in the package list 222 exceeds a threshold value 234, if computing security risk score 232 exceeds a threshold, and/or the like. If the threshold value 234 (e.g., which may be a threshold number of phantom packages, a threshold number of malicious packages, a threshold computing security risk score value and/or the like) is exceeded, then the second set of code 212 may be identified as unsecure code 244. If the threshold value 234 is not exceeded, then the second set of code 212 may be identified as safe code 242. As discussed in more detail below with respect to FIG. 3, one or more actions may be taken to remediate security risks associated with unsecure code 244, such as discarding unsecure code 244, determining not to display unsecure code 244 via a user interface, generating alternative code (e.g., using model 110 or another model), such as using a prompt that instructs the model not to use one or more identified phantom packages, generating a notification, determining not to use model 110 for future code generation, re-training model 110, modifying a prompt provided to model 110 for future code generation, and/or the like.

In some cases, if one or more phantom packages or malicious packages (e.g., the same phantom package) are detected in multiple sets of code generated by the same model (e.g., model 110), such as in more than a threshold number of sets of code, then one or more actions may be taken. For example, the model may be discarded and/or otherwise not used for future code generation. In another example, the model may be re-trained (e.g., using a different set of training data than was used to previously train or fine-tune the model), such as based on the possibility that the training data with which the model was previously trained was poisoned with malicious or unsecure code. In another example, a notification may be generated in connection with detecting such packages, such as notifying a developer, expert, model provider, and/or the like of the repeated inclusion of one or more phantom packages in code generated by a particular model, and such a notification may cause such an individual or entity to review and/or address such a package or model.

Figure 3:
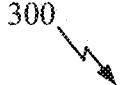
FIG. 3 depicts an additional example workflow related to detecting and filtering packages in code generated by language processing machine learning models.
Figure 3:
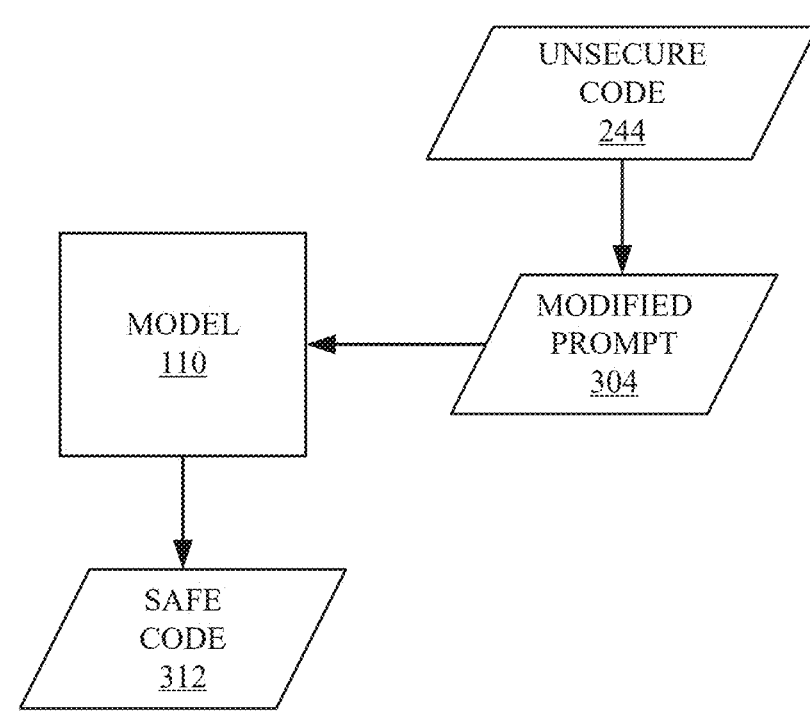

FIG. 3 depicts an additional example workflow 300 related to detecting and filtering packages in code generated by language processing machine learning models. In particular, FIG. 3 depicts additional steps to be performed using model 110 subsequent to those depicted in FIG. 1 and FIG. 2.

Unsecure code 244 may be previously identified by the risk score evaluation 240 and threshold value 234 in FIG. 2 (and/or otherwise may be identified as unsecure based on the code containing one or more phantom packages and/or, in some aspects, malicious packages). A modified prompt 304 may be generated based on malicious code 244 in order to prompt the model 110 to generate safe code 312, wherein the safe code 312 is generated without phantom packages, without malicious packages, or both. For example, modified prompt 304 may be similar to a prompt that was used to generate unsecure code 244 except that modified prompt 304 may have been modified to include instructions not to use one or more packages that were identified as phantom packages and/or malicious packages in unsecure code 244. Model 110 may, accordingly, generate safe code 3121 based on modified prompt 304 without including the identified phantom packages and/or malicious packages. Safe code 312 may be analyzed based on phantom packages 132 of FIGS. 1 and 2, and, in some embodiments, malicious packages 224 of FIG. 2 in order to confirm that safe code 312 is safe (e.g., that safe code 312 does not include more than a threshold number of phantom packages, malicious packages, or both, and/or that a computing security risk score computed for safe code 312 does not exceed a threshold, and/or the like). If safe code 312 is confirmed based on such analysis to be safe, then safe code 312 may be displayed via a user interface and/or otherwise may be executed without the computing security risk that otherwise would have been posed by executing unsecure code 244.

Figure 4:
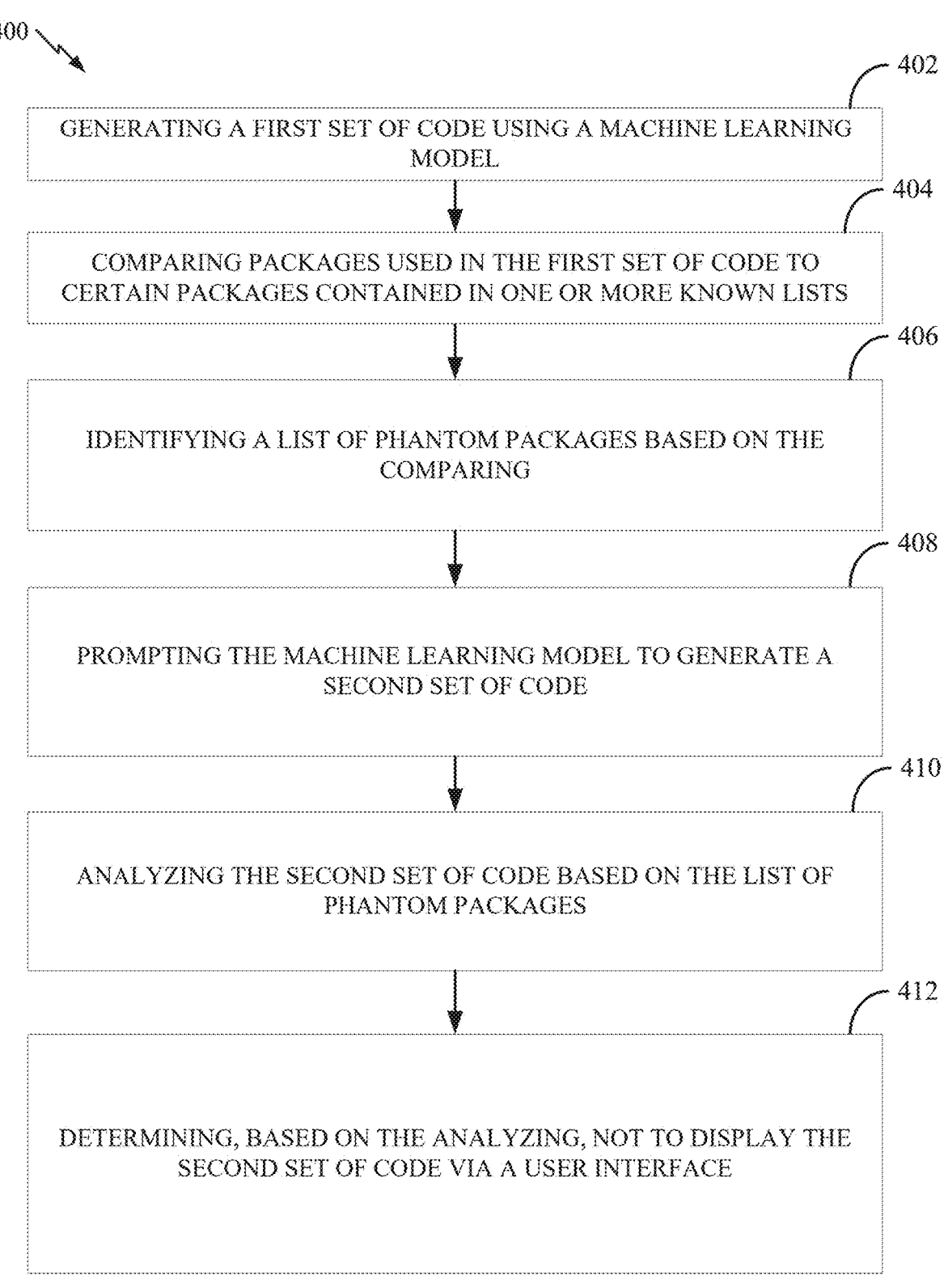
FIG. 4 depicts example operations related to detecting and filtering packages in code generated by language processing machine learning models.

Example Operations Related to Detecting and
Filtering Packages in Code Generated by Language
Processing Machine Learning Models FIG. 4 depicts example operations 400 related to detecting and filtering packages in code generated by language processing machine learning models. For example, operations 400 may be performed by one or more of the components described with respect to FIG. 1, FIG. 2, and/or FIG. 3.

Operations 400 begin at step 402 with generating a first set of code using a large language model (or other type of language processing machine learning model capable of generating code).

Operations 400 continue at step 404 with comparing packages used in the first set of code to certain packages contained in one or more known lists. In some embodiments, the comparing of the packages used in the first set of code to the certain packages in the one or more known lists comprises comparing the packages used in the first set of code to first packages contained in a list of malicious packages and comparing the packages used in the first set of code to second packages contained in a list of permissible packages. According to certain embodiments, the comparing of the packages used in the first set of code to the certain packages in the one or more known lists comprises identifying respective packages used in the first set of code based on one or more of: a regular expression search; a string search; or a syntax tree generated based on the first set of code.

Operations 400 continue at step 406 with identifying a list of phantom packages based on the comparing. Certain embodiments provide that the identifying the list of phantom packages comprises identifying particular packages contained neither in a list of malicious packages nor in a list of permissible packages and adding the particular packages to the list of phantom packages.

Operations 400 continue at step 408 with prompting the large language model to generate a second set of code.

Operations 400 continue at step 410 with analyzing the second set of code based on the list of phantom packages. Some embodiments provide that the analyzing of the second set of code based on the list of phantom packages comprises comparing respective packages in the second set of code to given packages contained in a list of malicious packages and to identified packages contained in the list of phantom packages. In other embodiments, the analyzing of the second set of code based on the list of phantom packages comprises detecting that one or more identified packages contained in the list of phantom packages were used in more than a threshold number of sets of code generated by the large language model and performing an action based on the detecting.

Operations 400 continue at step 412 with determining, based on the analyzing, not to display the second set of code via a user interface. In some embodiments, the determining not to display the generated code via a user interface is based on evaluating a risk score computed based on the analyzing. Certain embodiments provide that the evaluating of the risk score comprises determining whether packages used in the second set of code that are contained in one or more of a list of malicious packages or the list of phantom packages exceeds a threshold number of packages.

In certain embodiments, the method further comprises prompting the large language model to generate new code based on the analyzing. Some embodiments provide that the prompting of the large language model to generate new code based on the analyzing comprises instructing the large language model not to use one or more packages contained in the list of phantom packages when generating the new code.

Figure 5:
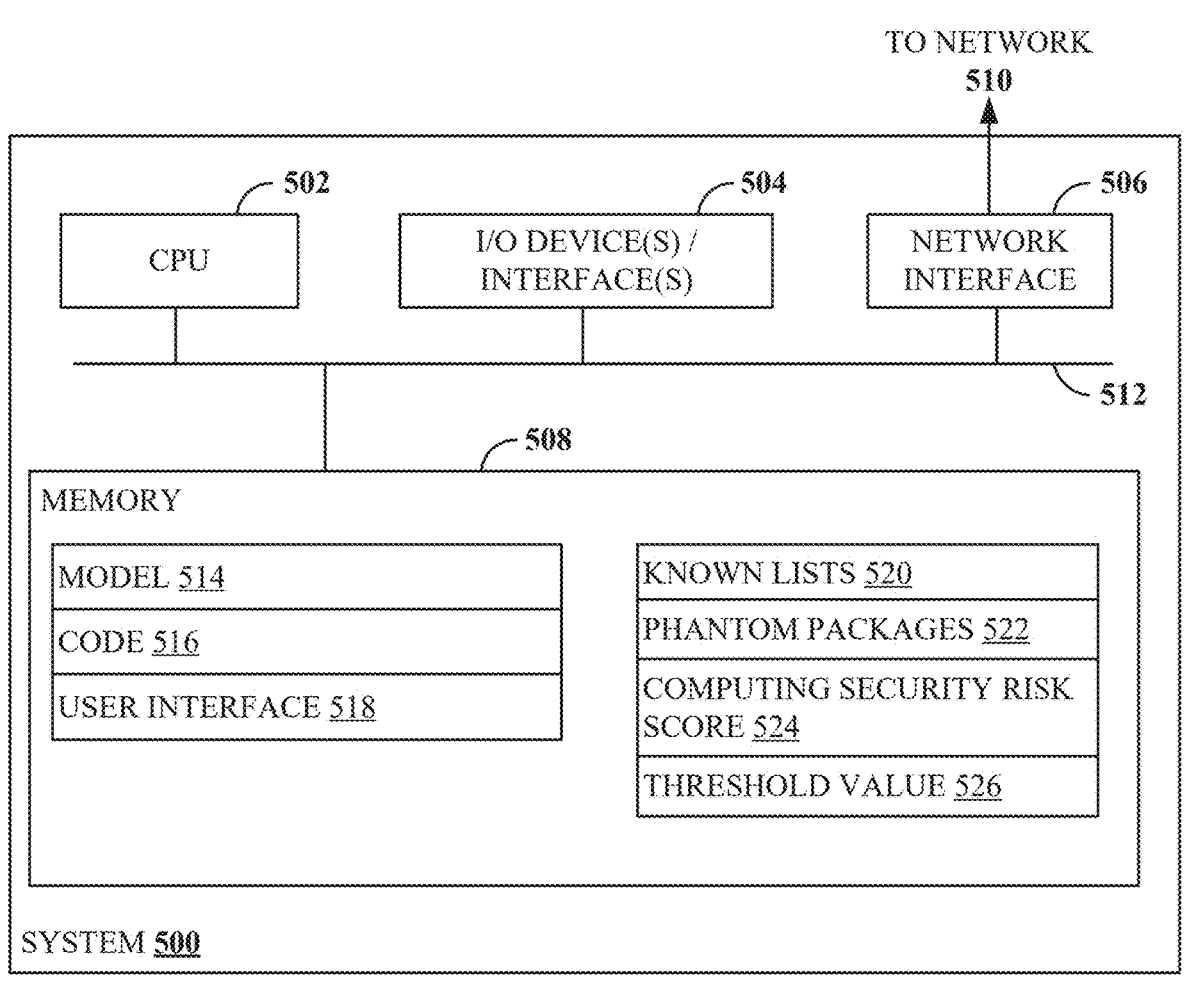
FIG. 5 depicts an example of a processing system for detecting and filtering packages in code generated by language processing machine learning models.

Example of a Processing System for Detecting and Filtering Packages in Code Generated by Language Processing Machine Learning Models FIG. 5 illustrates an example system 500 with which embodiments of the present disclosure may be implemented. For example, system 500 may be configured to perform operations 400 of FIG. 4 and/or to implement one or more components as in FIG. 1, FIG. 2, or FIG. 3.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes model 514, code 516, and user interface 518. Model 514 may be representative of model 110 of FIG. 1, FIG. 2, and FIG. 3. Code 516 may be representative of first set of code 112 of FIG. 1, second set of code 212 of FIG. 2, safe code 242 of FIG. 2, unsecure code 244 of FIG. 2 and FIG. 3, and/or safe code 312 of FIG. 3. User interface 518 may be used to display code and/or to receive input from a user, such as a natural language prompt related to code generation, a description and/or specifications and/or constraints related to code generation, feedback with respect to code and/or packages, and/or the like.

Memory 508 further comprises known lists 520 which may correspond to known packages 124 of FIG. 1 and/or malicious packages 224 of FIG. 2. Memory 508 further comprises phantom packages 522, which may correspond to phantom packages 132 of FIG. 1 and FIG. 2. Memory 508 further comprises computing security risk score 524, which may correspond to computing security risk score 232 of FIG. 2. Memory 508 further comprises threshold value 526, which may correspond to threshold value 234 of FIG. 2. It is noted that in some embodiments, system 500 may interact with one or more external components, such as via network 510, in order to retrieve data and/or perform operations. Furthermore, techniques described herein may be implemented via more or fewer components than those shown and described with respect to FIG. 5, such as on one or more computing systems.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer implemented method executed using one or more hardware processors, for detecting and filtering phantom packages in code generated by large language models, the method comprising:

generating a first set of code using a large language model;

comparing packages used in the first set of code to certain packages contained in one or more known lists, wherein the comparing of the packages used in the first set of code to the certain packages in the one or more known lists comprises comparing the packages used in the first set of code to first packages contained in a list of malicious packages and comparing the packages used in the first set of code to second packages contained in a list of permissible packages;

identifying a list of phantom packages based on the comparing;

prompting the large language model to generate a second set of code;

analyzing the second set of code based on the list of phantom packages, wherein the analyzing of the second set of code based on the list of phantom packages comprises comparing respective packages in the second set of code to given packages contained in a list of malicious packages and to identified packages contained in the list of phantom packages; and based on the analyzing, automatically performing an action that results in the second set of code not being executed within a computing environment.

2. The method of claim 1, wherein the comparing of the packages used in the first set of code to the certain packages in the one or more known lists comprises identifying respective packages used in the first set of code based on one or more of:

a regular expression search;

a string search; or a syntax tree generated based on the first set of code.

3. The method of claim 1, wherein the identifying the list of phantom packages comprises identifying particular packages contained neither in a list of malicious packages nor in a list of permissible packages and adding the particular packages to the list of phantom packages.

4. The method of claim 1, wherein the automatically performing the action that results in the second set of code not being executed within the computing environment is based on evaluating a risk score computed based on the analyzing.

5. The method of claim 4, wherein the evaluating of the risk score comprises determining whether packages used in the second set of code that are contained in one or more of a list of malicious packages or the list of phantom packages exceeds a threshold number of packages.

6. The method of claim 1, further comprising prompting the large language model to generate new code based on the analyzing.

7. The method of claim 6, wherein the prompting of the large language model to generate new code based on the analyzing comprises instructing the large language model not to use one or more packages contained in the list of phantom packages when generating the new code.

8. The method of claim 1, wherein the analyzing of the second set of code based on the list of phantom packages comprises detecting that one or more identified packages contained in the list of phantom packages were used in more than a threshold number of sets of code generated by the large language model and performing an action based on the detecting.

9. A system for detecting and filtering phantom packages in code generated by large language models, comprising:

one or more processors; and a memory comprising instructions that, when executed by the one or more processors, cause the system to:

generating a first set of code using a large language model;

comparing packages used in the first set of code to certain packages contained in one or more known lists, wherein the comparing of the packages used in the first set of code to the certain packages in the one or more known lists comprises comparing the packages used in the first set of code to first packages contained in a list of malicious packages and comparing the packages used in the first set of code to second packages contained in a list of permissible packages;

identifying a list of phantom packages based on the comparing;

prompting the large language model to generate a second set of code;

analyzing the second set of code based on the list of phantom packages, wherein the analyzing of the second set of code based on the list of phantom packages comprises comparing respective packages in the second set of code to given packages contained in a list of malicious packages and to identified packages contained in the list of phantom packages; and based on the analyzing, automatically performing an action that results in the second set of code not being executed within a computing environment.

10. The system of claim 9, wherein the comparing of the packages used in the first set of code to the certain packages in the one or more known lists comprises identifying respective packages used in the first set of code based on one or more of:

a regular expression search;

a string search; or a syntax tree generated based on the first set of code.

11. The system of claim 9, wherein the identifying the list of phantom packages comprises identifying particular packages contained neither in a list of malicious packages nor in a list of permissible packages and adding the particular packages to the list of phantom packages.

12. The system of claim 9, wherein the automatically performing the action that results in the second set of code not being executed within the computing environment is based on evaluating a risk score computed based on the analyzing.

13. The system of claim 12, wherein the evaluating of the risk score comprises determining whether packages used in the second set of code that are contained in one or more of a list of malicious packages or the list of phantom packages exceeds a threshold number of packages.

14. The system of claim 9, wherein the instructions, when executed by the one or more processors, further cause the system to prompt the large language model to generate new code based on the analyzing.

15. The system of claim 14, wherein the prompting of the large language model to generate new code based on the analyzing comprises instructing the large language model not to use one or more packages contained in the list of phantom packages when generating the new code.

16. A non-transitory computer readable medium comprising instructions that, when executed by one or more processors of a computing system, cause the computing system to:

generating a first set of code using a large language model;

comparing packages used in the first set of code to certain packages contained in one or more known lists, wherein the comparing of the packages used in the first set of code to the certain packages in the one or more known lists comprises comparing the packages used in the first set of code to first packages contained in a list of malicious packages and comparing the packages used in the first set of code to second packages contained in a list of permissible packages;

identifying a list of phantom packages based on the comparing;

prompting the large language model to generate a second set of code;

analyzing the second set of code based on the list of phantom packages, wherein the analyzing of the second set of code based on the list of phantom packages comprises comparing respective packages in the second set of code to given packages contained in a list of malicious packages and to identified packages contained in the list of phantom packages; and based on the analyzing, automatically performing an action that results in the second set of code not being executed within a computing environment.

* * * * *